United States Patent [19]
Hsu

[11] Patent Number: 5,844,345
[45] Date of Patent: Dec. 1, 1998

[54] HOMOPOLAR MOTOR WITH DUAL ROTORS

[75] Inventor: John S. Hsu, Oak Ridge, Tenn.

[73] Assignee: Lockheed Martin Energy Research Corporation, Oak Ridge, Tenn.

[21] Appl. No.: 929,545

[22] Filed: Sep. 15, 1997

[51] Int. Cl.$^6$ ................................................. H02K 31/00
[52] U.S. Cl. ........................................... 310/178; 310/115
[58] Field of Search ...................... 310/177, 178, 310/126, 10, 40 R, 102 A, 102 R, 115

[56] References Cited

U.S. PATENT DOCUMENTS

| | | | |
|---|---|---|---|
| 2,462,182 | 2/1949 | Guerdan et al. | 310/114 |
| 3,096,454 | 7/1963 | Sears | 310/178 |
| 3,656,013 | 4/1972 | Hooper | 310/10 |
| 3,944,865 | 3/1976 | Jewitt | 310/178 |
| 4,056,746 | 11/1977 | Burtis | 310/115 |
| 5,089,734 | 2/1992 | Bickraj | 310/83 |
| 5,530,309 | 6/1996 | Weldon | 310/178 |

OTHER PUBLICATIONS

Varadarajan, IBM Technical Disclosure Bulletin, vol. 17, No. 6, pp. 1786–1787 Nov. 1994.

*Primary Examiner*—Nestor Ramirez
*Assistant Examiner*—B. Mullins
*Attorney, Agent, or Firm*—Quarles & Brady

[57] ABSTRACT

A homopolar motor (10) has a field rotor (15) mounted on a frame (11) for rotation in a first rotational direction and for producing an electromagnetic field, and an armature rotor (17) mounted for rotation on said frame (11) within said electromagnetic field and in a second rotational direction counter to said first rotational direction of said field rotor (15). The two rotors (15, 17) are coupled through a 1:1 gearing mechanism (19), so as to travel at the same speed but in opposite directions. This doubles the output voltage and output power, as compared to a motor in which only the armature is rotated. Several embodiments are disclosed.

20 Claims, 6 Drawing Sheets

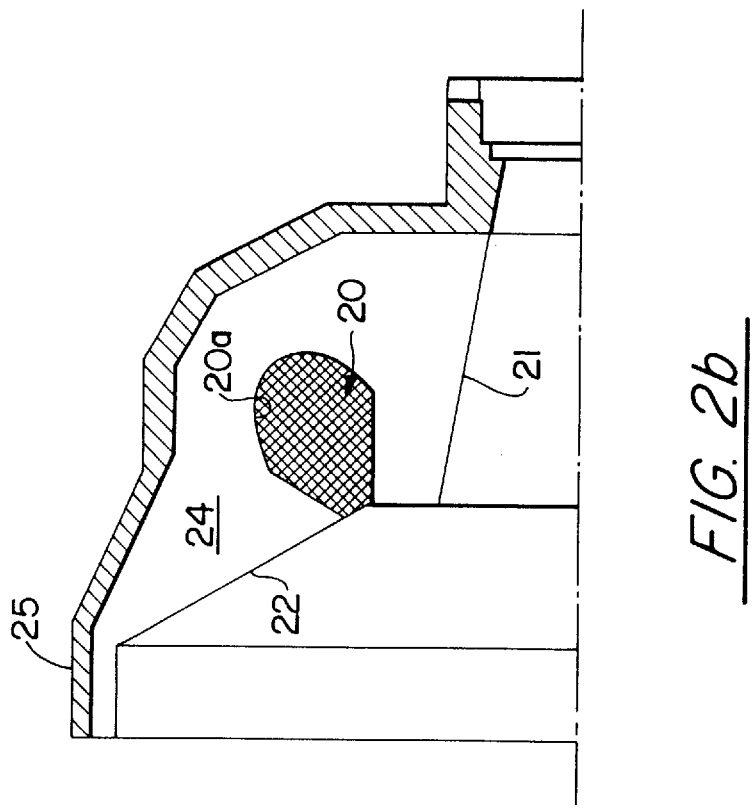
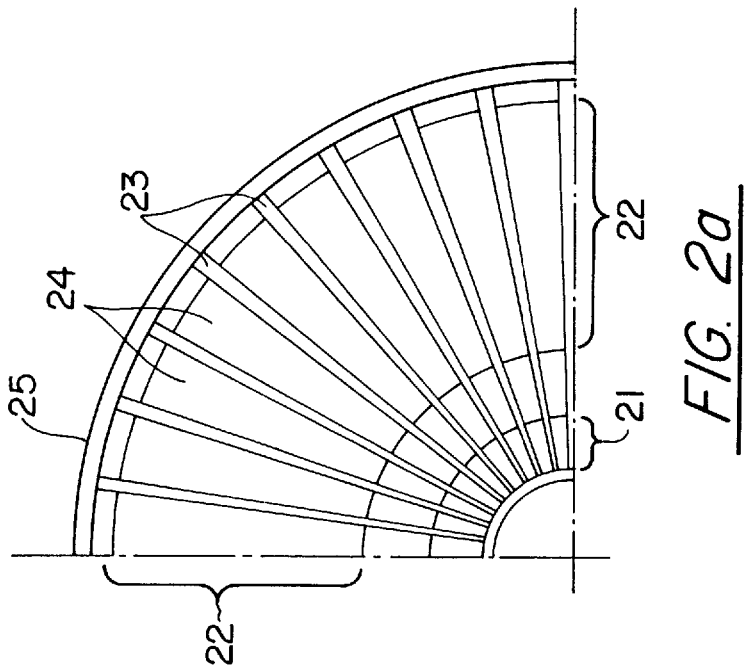

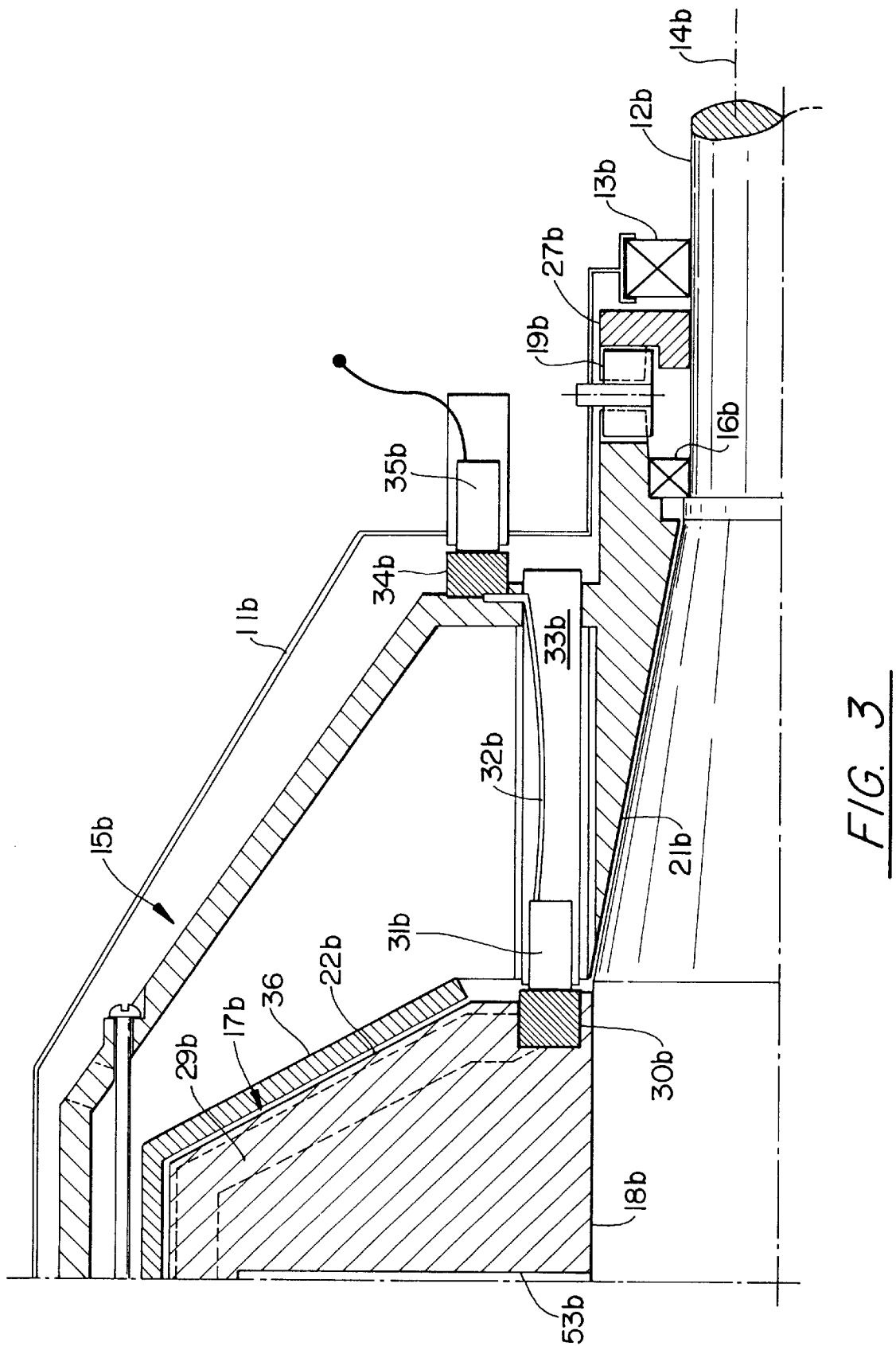

HOMOPOLAR MOTOR WITH DUAL ROTORS

STATEMENT REGARDING FEDERALLY SPONSORED RESEARCH

This invention was made with Government support under Contract No. DE-AC05-840R21400 awarded by the U.S. Dept. of Energy. The Government has certain rights in the invention.

TECHNICAL FIELD

The field of the invention power systems for electric vehicles and, in particular, homopolar DC motors.

DESCRIPTION OF THE BACKGROUND ART

There is a need for improved power systems to be used in electric vehicles. Currently, many proposals include AC motors and an inverter for converting the DC power output of energy storage devices, such as batteries or flywheels, to AC power. Inverters add much to the overall cost of the power system, and therefore it would be advantageous to use DC motors in such a power system.

In considering the use of DC motors for electric vehicles, there is a problem of commutator-spark and flashover with some types of DC motors. A homopolar motor is a type of DC motor that has typically used brushes and slip rings. The homopolar motor also has a smooth torque output and does not exhibit cogging torque. The disadvantages of homopolar motors for this use are low operating voltage, high operating current, and considerable weight and bulk.

SUMMARY OF THE INVENTION

The present invention provides a homopolar DC machine, having a field rotor mounted for rotation in a first rotational direction and for producing an electromagnetic field, and an armature rotor mounted for rotation in said frame within said electromagnetic field and in a second rotational direction counter to said first rotational direction of said field rotor.

This construction doubles the armature voltage at a given speed in comparison with prior homopolar motors using a stationary field core, and doubles the induced electromagnetic forces and power output of the motor for a given size.

In one embodiment, the armature rotor rotates inside of the field rotor, and a novel arrangement of brushes and slip rings is provided to collect current from the armature through a passageway in the field rotor. The arrangement of slip rings and brushes provides low brush speeds and accessibility of the brushes for maintenance and replacement.

Another feature of the invention is double insulation in the armature. A first level of insulation is provided by insulation around the armature windings. A second level of insulation is provided at an interface between the armature and the shaft on which it rotates.

The invention also provides a gearing arrangement between the field rotor and the armature rotor, the gearing arrangement being mounted on a frame for the motor to control the speed of the field rotor relative to the armature rotor. The preferred ratio of speed of the field rotor to the armature rotor is 1:1.

The invention also provides embodiments using permanent magnets in lieu of field windings, and in some of these embodiments, the field rotor may be located inside of the armature rotor.

The invention also allows for advantageous orientation of the air gaps between the field rotor and armature rotor.

The invention is applicable to both motors and generators and provides an important advance for power systems for electric vehicles.

Other objects and advantages, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and, therefore, reference is made to the following claims which follow the description for determining the scope of the invention.

BRIEF DESCRIPTION OF THE DRAWINGS

FIG. 2a is a quarter section end view of a field rotor seen in FIG. 1;

FIG. 2b is a longitudinal partial section view of a field rotor seen in FIG. 1;

FIG. 3 is a longitudinal quarter section view of a second embodiment of the present invention;

DETAILED DESCRIPTION OF THE PREFERRED EMBODIMENTS

Figure 1:
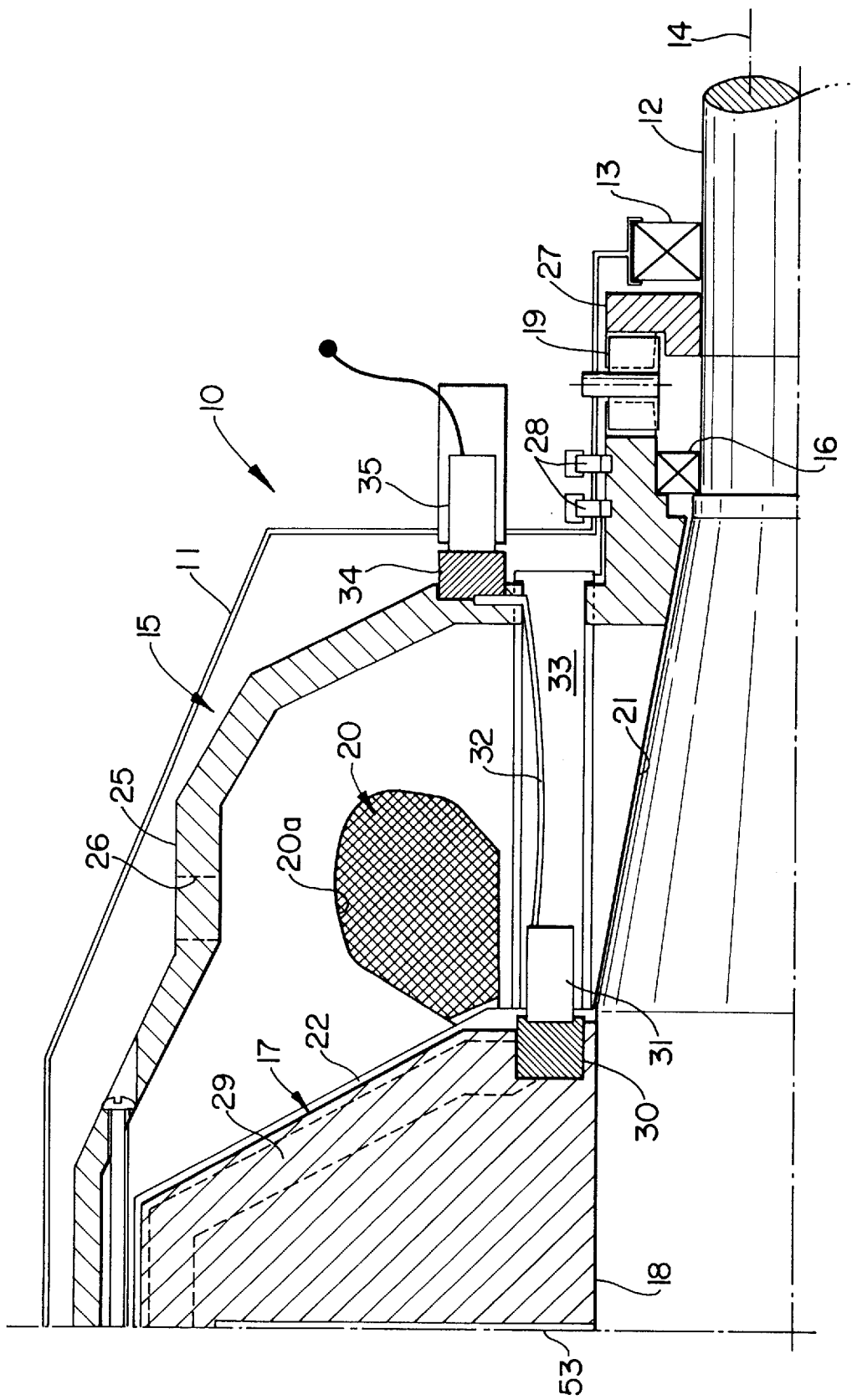
FIG. 1 is a longitudinal quarter section view of a first embodiment of the present invention.

Referring to FIGS. 1, 2a and 2b, a first embodiment of a motor of the invention is represented generally by reference number 10. Referring first to FIG. 1, the motor 10 has a stationary frame 11 in which a central shaft 12 is supported by annular shaft bearing 13. The shaft 12 rotates around a central axis 14 disposed horizontally as seen in the Figures. Inside the frame 11, a field rotor 15 is mounted on the shaft 12 by annular shaft bearing 16, which allows the field rotor 15 to rotate in a direction opposite the shaft 12. An armature rotor 17 is mounted in a fixed manner to the shaft 12 for rotation in the same rotational direction as the shaft 12, and opposite the rotational direction of the field rotor 15. The armature rotor 17 is insulated from the shaft 12 by a very thin high temperature and high mechanical strength insulation 18, such as a ceramic coating. The field rotor 15 is coupled to the shaft 12, and to the armature 17 by a 1:1 gear mechanism 19, which is mounted through a gear shaft to the frame 11. The shaft 12 has an annular flange 27 which engages the gears in gear mechanism 19.

The field rotor 15 has a field coil 20 (FIG. 1) which is situated in annular passageway 20a (FIG. 2) forms a toroid around the shaft 12. A second field coil (not shown) would encircle the shaft 12 near the opposite end. The upper left quarter section of the motor (not shown) is a mirror image of the upper right quarter section represented by FIG. 1. Current is supplied to the field coil 20 through brushes 28 mounted on the frame 11 and a conductor (not shown) running to the field coil 20. The current in the field coil 20 produces an electromagnetic field through the field rotor 15 and in an air gap 21, 22 (FIGS. 1, 2b) having a portion 21 along a frustoconical portion of the shaft 13 and having a portion 22 oriented an at angle to shaft 13 and separating the field rotor 15 and the armature rotor 17. As seen in FIG. 2a (looking at the field rotor 15 in FIG. 2b from the inside), the field rotor 15 has radial gaps 23 disposed between radial ribs 24 to form a strong, comb-shaped core of magnetic material that reduces peripheral magnetic flux produced by current in conductors of the armature rotor 17. Referring back to FIG. 1, the outer peripheral wall 25 of the field rotor has vents 26 formed therein to allow escape of heat from the field coil 20.

The armature core 17 is made of a magnetic material and has a radially enlarged middle section (FIG. 1) which extends up to the outer wall 25 of the field rotor 15 and provides an angle for the air gap portion 22. The armature 17 has passageways 28 (FIG. 1) in which a plurality of insulated armature conductors (not shown) run longitudinally in the passageways 29. The passageways 29 are insulated along their surfaces. There is also a slit 53 at the center of the armature core 17. In the event of armature insulation breakdown, a major portion of the current will still flow in the armature conductors. The armature conductors connect to an armature slip ring 30 located at a short radial distance from the shaft 12 and centered around the axis of rotation 14 for the shaft 12. The armature slip ring 30 is insulated from the armature core 17. This slip ring 30 is contacted by one or more stationary armature brushes 31 connected to conductors 32 and situated with the conductors 32 in annular passageways 33 (FIGS. 1, 2a) through the field rotor 15. The conductors 32 connect to a slip ring 34 on the end of the field rotor 15. This slip ring 34 is also located at a short radial distance from the shaft 12 and is centered around the axis of rotation 14 for the shaft 12. The slip ring 34 is also insulated from the field rotor core 15. The slip ring 34 is contacted by another stationary brush 35 which receives the armature current first picked up through brush 31. In this way, a construction is provided for picking up current from the armature rotor 17, which is rotating within the field rotor 15.

In operation, the field rotor 15 rotates in one rotation direction, and the armature rotor 17 rotates with the shaft 12 in an opposite rotational direction and within the electromagnetic field. This construction doubles the armature voltage at a given speed in comparison with prior homopolar motors using a stationary field core, and doubles the induced electromagnetic forces and power output of the motor for a given size.

FIG. 3 shows a second embodiment of the invention, which is similar to the first embodiment, except that the field coil 20 has been replaced by a permanent magnet 36, which is carried by the field rotor 15b immediately adjacent air gap portion 21b. Parts which correspond to the parts in FIGS. 1, 2a and 2b have been given a like reference number and the suffix "b".

Figure 4:
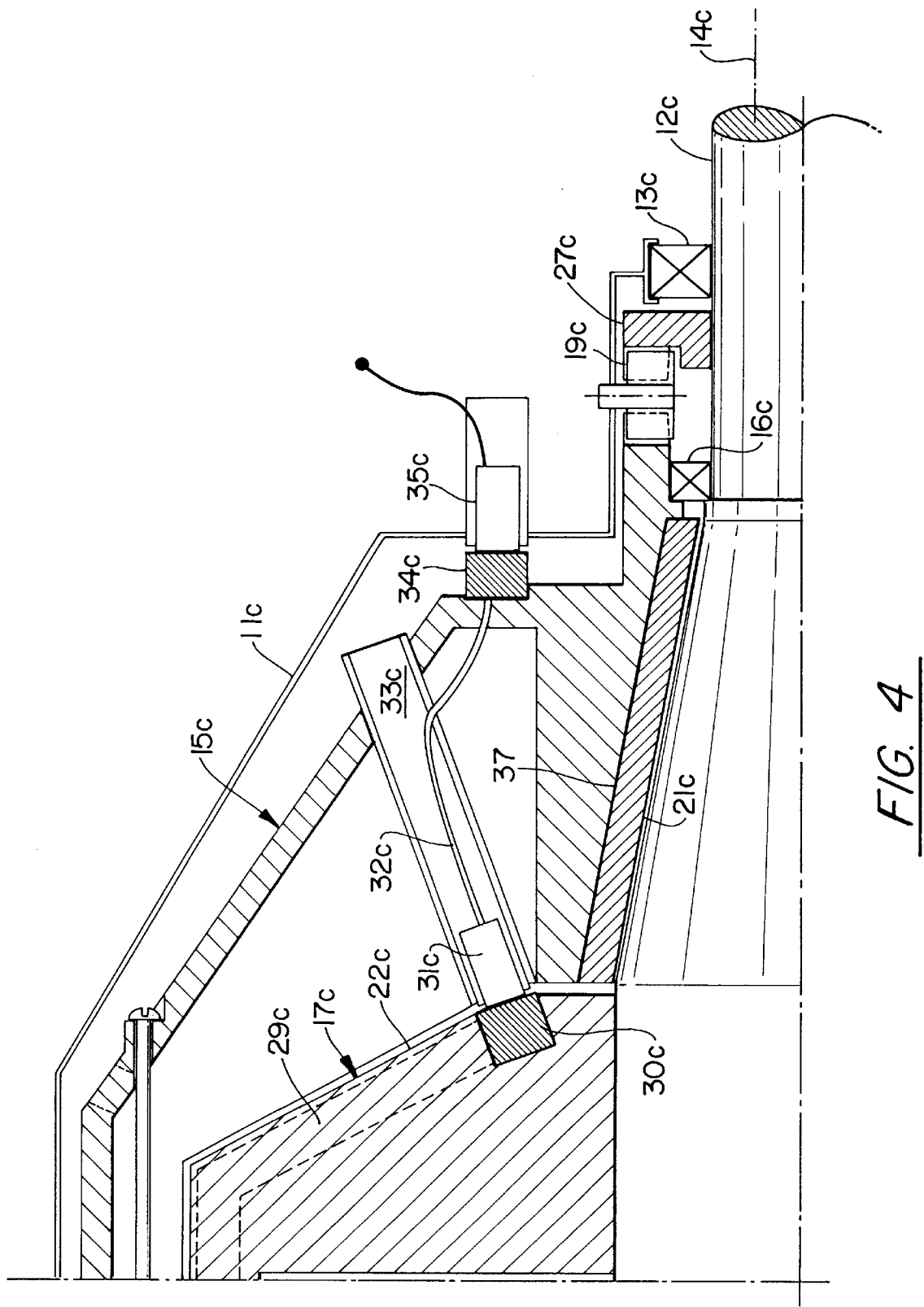
FIG. 4 is a longitudinal quarter section view of a third embodiment of the invention.

FIG. 4 illustrates a third embodiment of the invention, which is similar to the first and second embodiments, except that the permanent magnet 37 for producing the electromagnetic field is disposed on the field rotor 15c immediately adjacent the air gap portion 22c. As a result of this positioning, the armature slip ring 30c, the armature brush 31c and the passageway 33c have been oriented upward at an angle from the shaft 12c. Parts which correspond to the parts in FIGS. 1 and 3 have been given a like reference number and the suffix "c".

Figure 5:
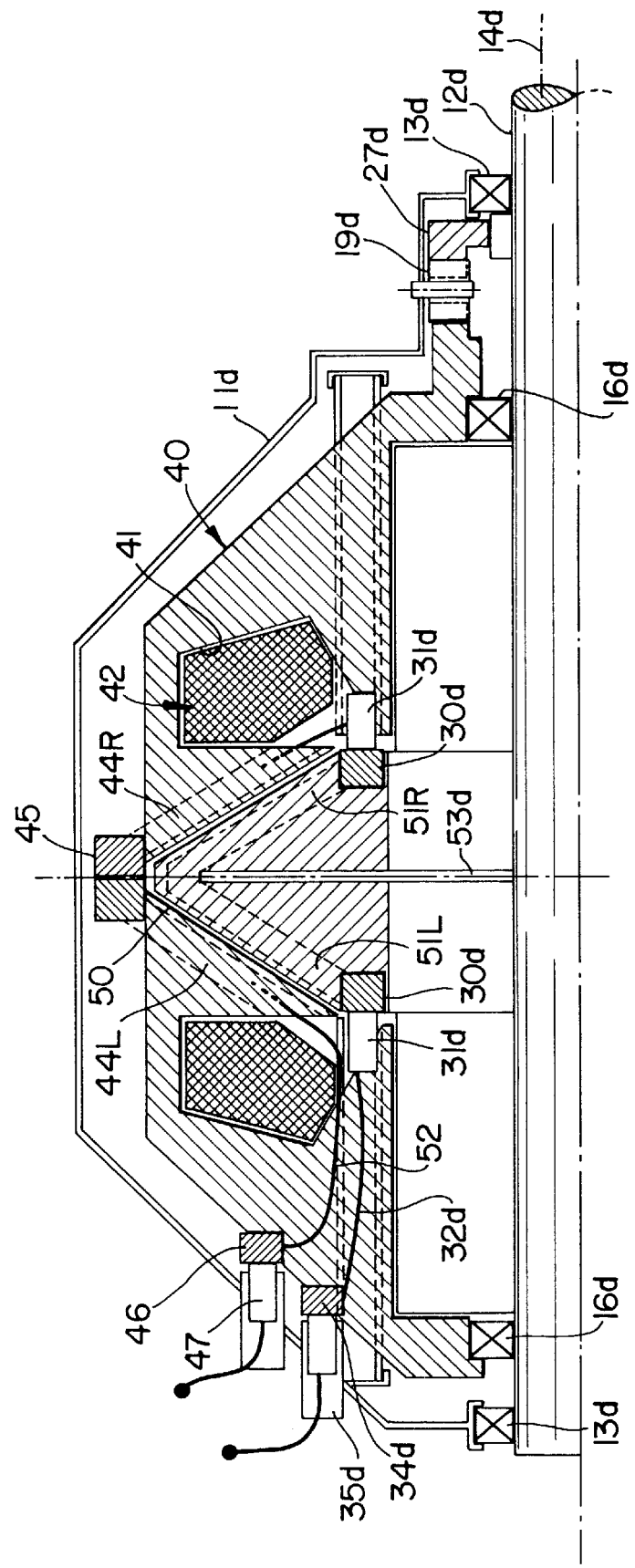
FIG. 5 is a longitudinal half section view of a fourth embodiment of the invention.

FIG. 5 illustrates an embodiment of the invention in which a field rotor 40 is mounted in a frame 11d on two bearings 16d to rotate opposite to shaft 12d and armature rotor 48. The field rotor 40 is also coupled to the armature rotor 48 through a 1:1 gearing mechanism 19d and flange 27d similar to the first embodiment. The rotor 40 has an annular cavity 41 in which a toroidal field coil 42 is situated around an axis 14d of the shaft 12d. Field current is supplied in a manner similar to the embodiment in FIG. 1.

The armature rotor 48 is mounted in a fixed manner to shaft 12 and has a radially extending, tapered, middle portion which rotates within a cavity in the field rotor 40. The armature rotor 48 is spaced a short distance from the field rotor 40 in the cavity to form an air gap 50. On the other side of air gap 50, the armature rotor 48 has insulated conductors running through insulated passageways 51R, 51L.

Armature current is supplied through brush 47 to slip ring 46, and from there through conductor 52, and conductors in passageway 44L to connection rings 45. These rings 45 connect to conductors in passageway 44R, which connect to brush 31d, which contacts slip ring 30d. Slip ring 30d is in turn connected to armature conductors in passageway 51R, 51L, to opposite slip ring 30d, which is contacted by a second brush 31d. The second brush 31d is connected by conductor 32d to slip ring 34d and brush 35d to complete a circuit for the armature current. The conductors in passageways 44R and 44L of the field rotor 40, the conductors in passageways 51R and 51L of the armature rotor 48, and the connection rings 45 form a compensating winding. The compensating winding acts to reduce peripheral flux caused by the armature current and to allow for use of a core other than the comb-shaped core of FIGS. 1, 2a and 2b.

Figure 6:
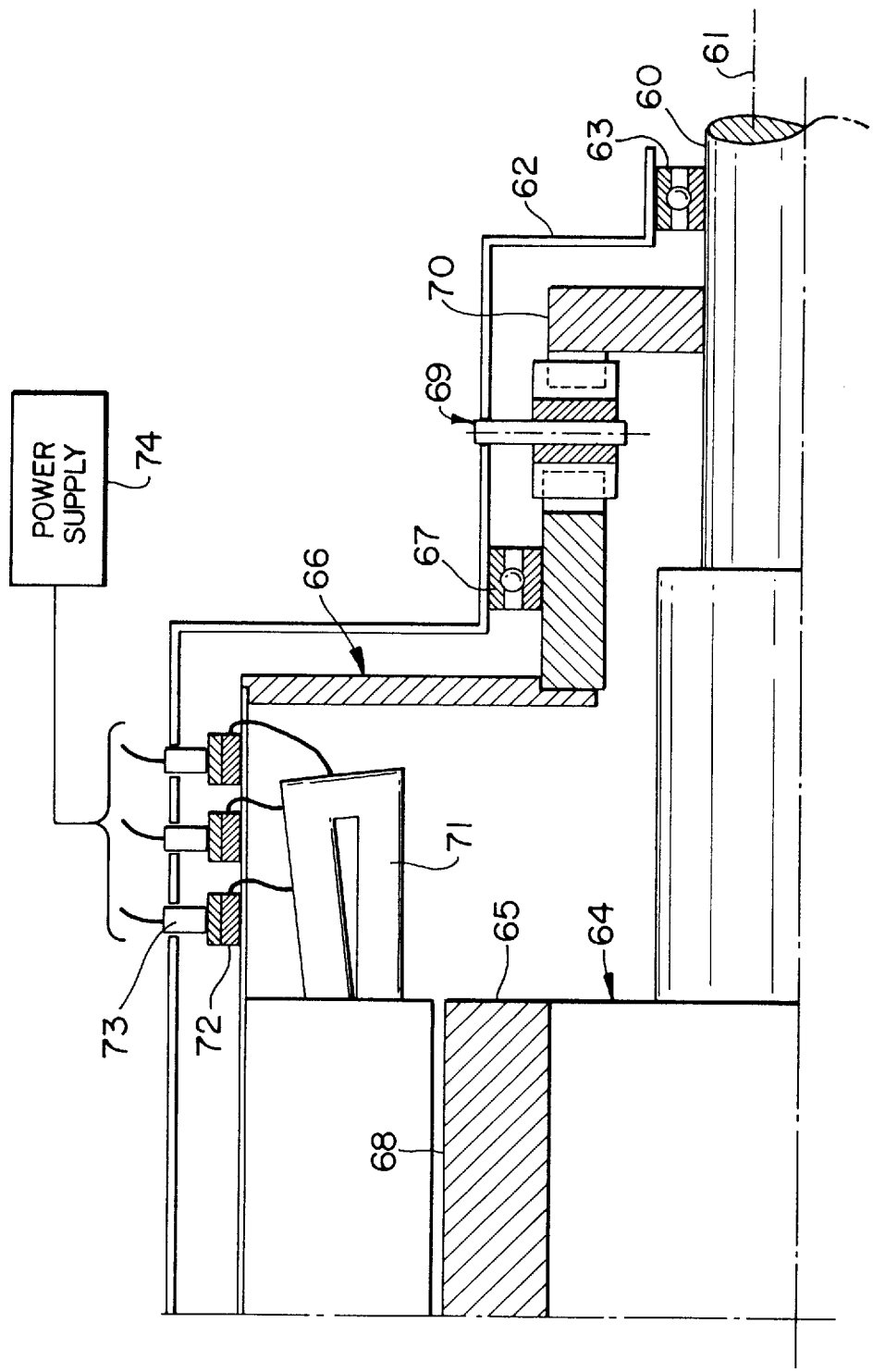
FIG. 6 is a longitudinal quarter section view of a fifth embodiment of the invention.

FIG. 6 illustrates yet another embodiment of the invention in which a shaft 60 is mounted in frame 62 by annular shaft bearing 63 and rotates around axis of rotation 61. A first rotor 64 is mounted in fixed fashion on the shaft 60 and has one or more permanent magnets 65 located radially outward of the shaft 60 adjacent annular air gap 68 to provide a field. A second rotor 66 is also mounted in the frame 62 by annular bearing 67, but rotates outside the PM rotor 64 and in an opposite rotational direction. The first rotor 64 is coupled to the second rotor 66 through 1:1 gear mechanism 69 and annular flange 70. The second rotor 66 carries a winding 71 which is connected to slip rings 72, so that the second rotor 66 functions as an armature. The slip rings 72 are contacted by brushes 73 mounted on frame 62. The brushes 73, in turn, are electrically connected by wires to power supply 74 for supplying current to the second rotor 66.

The invention has been described in relation to several preferred embodiments. In these embodiments electrical power is an input and mechanical shaft torque is an output, as is typical of motors. It should be apparent that this power conversion can be reversed so that the invention is also applicable to generators in which mechanical power is input through the shaft and electrical power is output from the outer rotor. Various other details of these embodiments may be modified or substituted, while still carrying out the invention. Therefore, to apprise the public of the embodiments covered by the invention, the following claims are made.

I claim:

1. A homopolar DC machine, comprising:
 a frame;
 a first rotor mounted for rotation in said frame in a first rotational direction, said first rotor carrying means for producing an electromagnetic field;
 a second rotor mounted for rotation in said frame within said electromagnetic field and in a second rotational direction counter to said first rotational direction of said first rotor, said second rotor having a current slip ring and at least one current brush for receiving current produced by the machine;

a shaft disposed along an axis around which the first rotor and second rotor each rotate;

wherein one of the first rotor and the second rotor is a field rotor, and wherein another one of the first rotor and second rotor carries an armature;

wherein the field rotor is arranged to produce flux traveling both radially in relation to said shaft and axially through said shaft;

and wherein said armature is electrically insulated from said shaft.

2. The homopolar DC machine of claim 1, wherein the first rotor rotates at a same speed as the second rotor, but in an opposite direction, thereby doubling the output voltage in relation to a machine with a stationary field core.

3. The homopolar DC machine of claim 2, further comprising a gear ratio mechanism coupling the first rotor and the second rotor.

4. The homopolar DC machine of claim 1, wherein the first rotor is a field rotor, wherein the second rotor is an armature rotor, and wherein the armature rotor rotates inside the field rotor.

5. The homopolar DC machine of claim 4, wherein the means for producing the electromagnetic field includes at least one permanent magnet.

6. The homopolar DC machine of claim 4, wherein the means for producing the electromagnetic field includes a field coil.

7. The homopolar DC machine of claim 4, wherein said armature rotor has a slip ring positioned at one end of the armature rotor around a common axis of rotation for the armature rotor and the field rotor;

wherein said field rotor has a slip ring positioned around the common axis of rotation and at the end of field rotor nearest the slip ring on the armature rotor;

wherein said field rotor has a passageway therethrough for making an electrical connection between the slip ring on said armature rotor and said slip ring on said field rotor; and further comprising at least one brush for receiving armature current from the slip ring on said field rotor.

8. The homopolar DC machine of claim 4, further comprising a rotatable shaft, and wherein said armature is insulated from the rotatable shaft by a band of insulating material.

9. The homopolar DC machine of claim 3, wherein the first rotor rotates inside the second rotor.

10. The homopolar DC machine of claim 9, wherein the means for producing the electromagnetic field includes a permanent magnet.

11. A power system for an electric vehicle, wherein an improvement comprises a homopolar DC machine, further comprising:

a frame;

a first rotor mounted for rotation in said frame in a first rotational direction, said first rotor carrying means for producing an electromagnetic field;

a second rotor mounted for rotation in said frame within said electromagnetic field and in a second rotational direction counter to said first rotational direction of said first rotor, said second rotor having a current slip ring and at least one current brush for receiving current produced by the machine;

a shaft disposed along an axis around which the first rotor and second rotor each rotate;

wherein one of the first rotor and the second rotor is a field rotor, and wherein another one of the first rotor and second rotor carries an armature;

wherein the field rotor is arranged to produce flux traveling both radially in relation to said shaft and axially through said shaft;

and wherein said armature is electrically insulated from said shaft.

12. The power system of claim 11, wherein the first rotor rotates at a same speed as the second rotor, but in an opposite direction, thereby doubling the output voltage in relation to a machine with a stationary field core.

13. The power system of claim 12, further comprising a gear ratio mechanism coupling the first rotor and the second rotor.

14. The power system of claim 11, wherein the first rotor is a field rotor, wherein the second rotor is an armature rotor, and wherein the armature rotor rotates inside the field rotor.

15. The power system of claim 14, wherein the means for producing the electromagnetic field includes at least one permanent magnet.

16. The power system of claim 14, wherein the means for producing the electromagnetic field includes a field coil.

17. The power system of claim 14, wherein said armature rotor has a slip ring positioned at one end of the armature rotor around a common axis of rotation for the armature rotor and the field rotor;

wherein said field rotor has a slip ring positioned around the common axis of rotation and at the end of field rotor nearest the slip ring on the armature rotor;

wherein said field rotor has a passageway therethrough for making an electrical connection between the slip ring on said armature rotor and said slip ring on said field rotor; and further comprising at least one brush for receiving armature current from the slip ring on said field rotor.

18. The power system of claim 14, further comprising a rotatable shaft, and wherein said armature is insulated from the rotatable shaft by a band of insulating material.

19. The power system of claim 13, wherein the first rotor rotates inside the second rotor.

20. The power system of claim 19, wherein the means for producing the electromagnetic field includes a permanent magnet.

* * * * *